United States Patent [19]
Welch

[11] Patent Number: 5,948,145
[45] Date of Patent: *Sep. 7, 1999

[54] GAS PURIFICATION PROCESS

[76] Inventor: Tommy D. Welch, 2050 Duncannon, NW., Canton, Ohio 44708

[*] Notice: This patent is subject to a terminal disclaimer.

[21] Appl. No.: 09/012,528

[22] Filed: Jan. 23, 1998

[51] Int. Cl.⁶ .................................................. B01D 45/08
[52] U.S. Cl. ............................. 95/269; 55/331; 55/336; 55/441; 55/463; 95/272
[58] Field of Search .............................. 95/267, 269, 272, 95/288; 55/331, 336, 441, 434, 463, 434.2, 434.4; 261/DIG. 54; 62/149, 150, 77, 292, 470, 473

[56] References Cited

U.S. PATENT DOCUMENTS

| | | | |
|---|---|---|---|
| 1,813,637 | 7/1931 | Powers | 55/463 |
| 2,632,523 | 3/1953 | Stephens et al. | 261/DIG. 54 |
| 2,863,318 | 12/1958 | Schroder | 261/DIG. 54 |
| 3,014,705 | 12/1961 | Colucci | 261/DIG. 54 |
| 3,464,189 | 9/1969 | Mergenthaler | 261/DIG. 54 |
| 3,725,271 | 4/1973 | Giannotti | 55/434 |
| 4,316,728 | 2/1982 | Caesar | 261/DIG. 54 |
| 4,434,626 | 3/1984 | Schmidt | 62/470 |
| 4,541,845 | 9/1985 | Michel-Kim | 95/269 |
| 5,138,847 | 8/1992 | Rollins | 62/292 |
| 5,243,832 | 9/1993 | Van Steenburgh, Jr. | 62/292 |
| 5,279,646 | 1/1994 | Schwab | 261/DIG. 54 |
| 5,438,845 | 8/1995 | Kirschner et al. | 62/172 |
| 5,599,365 | 2/1997 | Alday et al. | 55/463 |

*Primary Examiner*—Duane S. Smith
*Attorney, Agent, or Firm*—Sand & Sebolt

[57] ABSTRACT

This invention describes a process for the purification of a refrigerant gas by feeding the refrigerant through at least one venturi cell. In one configuration, the venturi will have a first conical segment with an open base through which said refrigerant gas can enter, and a second conical segment which is connectedly affixed to the first conical segment in a leak-proof manner and in communication with the segment to permit refrigerant gas flow therethrough in addition to a configuration that creates a pressure differential between said first and said second conical segments. There can be more than one venturi cell depending upon the degree of purification required for the refrigerant gas.

35 Claims, 5 Drawing Sheets

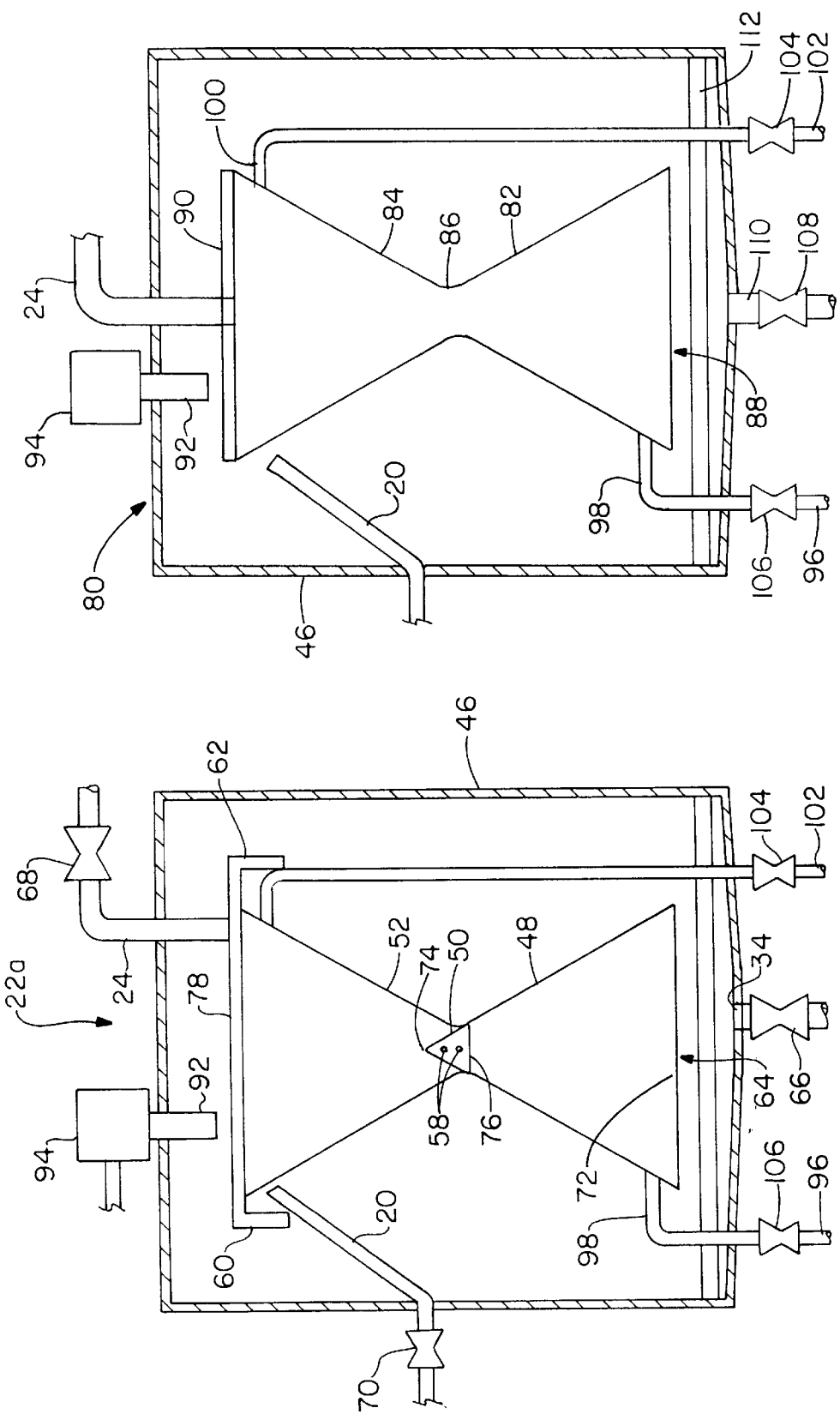

GAS PURIFICATION PROCESS

TECHNICAL FIELD

This invention relates to the recovery and purification of gases, particularly refrigerants, through the use of the venturi effect.

BACKGROUND OF THE INVENTION

Refrigeration systems such as those used in automotive and home appliances and air conditioners require that the refrigerant used be relatively free of foreign matter such as oil, water, and air. Since these systems rely on pressure to keep the refrigerant compressed, it is critical that hermetic integrity be maintained. If the refrigeration system breaks down, the refrigerant must be removed to facilitate the repair of the system. In the past, the refrigerant, a colorless, odorless gas, was discharged into the atmosphere. This discharge not only wasted the relatively expensive refrigerant, but also may have contributed significantly to the breakdown of the ozone layer of the earth's atmosphere. Because fluorocarbons used in automotive and household appliances are environmentally dangerous, it is desirable to prevent their harmful release.

Recycling capabilities provide a financial benefit for technicians who generally filter and reuse refrigerant instead of replacing it with relatively costly new refrigerants. Containment and recycling is also economically beneficial to the technician who recovers the refrigerant from refrigeration units which are beyond repair.

Unfortunately, the environmental and economic advantages of recycling refrigerant must compete with the temptation of simply releasing the refrigerant into the atmosphere. In light of this conflict, any successful recover or recycling system must provide repair personnel with an easy to use apparatus that encourages the recycling of the refrigerant in comparison to the easier course of merely releasing the refrigerant into the atmosphere.

Refrigerant recovery processes taught in the Prior Art have focused on the use of molecular sieves and silica gels, products which are expensive to purchase, and while re-usable, require the application of heat during the regeneration process. This step of heating adds significant costs to the economics of the process, and often adds to the temptation to simply discard the molecular sieves or silica gel, with associated appropriate environmental disposal concerns.

Venturi devices have found application in fluidized bed food freezers in which the refrigerant is turbo expanded air, and in which the refrigerant is circulated by a venturi-like device such as an ejector as patented in U.S. Pat. No. 5,438,845. Variable volume venturi devices have also been described as air induction inputs for air conditioning system. Each unit in this configuration was described as including a round inlet collar, an elongated plenum to form a venturi, hinged volume dampers, secondary air openings, bottom plenum chamber and a pattern controller and patented in U.S. Pat. No. 4,448,111.

More traditional uses of a venturi reside in the gas scrubber field, when used to remove particulate matter from a gaseous effluent stream, as for example in the following United States Patents: U.S. Pat. No. 5,279,646, U.S. Pat. No. 4,140,501; U.S. Pat. No. 4,057,602; U.S. Pat. No. 4,012,469; U.S. Pat. No. 3,998,612; U.S. Pat. No. 3,898,308; U.S. Pat. No. 3,690,044; U.S. Pat. No. 3,638,924; and U.S. Pat. No. 3,616,613.

To date, there still exists a need for a cost-effective technology which can purify gas streams, particularly refrigerants, which contain water vapor or oil contaminants or both, which capitalizes on venturi design, yet which is easy to operate without the need for heat-intensive regeneration procedures.

SUMMARY OF THE INVENTION

The present invention is directed to a novel apparatus and method for recovering, purifying and recycling gases, particularly refrigerants, which utilize the venturi and Joule-Thompson effects, in contrast to the use of molecular sieves and/or silica gels. When using the apparatus of this invention and depending upon the location of the purification cells, either upstream or downstream of the compressor, both water and/or acid and oil, are removed from the refrigerant gas(es) as well as non-condensables. The invention will utilize a plurality of impingement surfaces which aid in the coalescence of various condensable contaminants from the gas stream, for eventual recovery.

These and other objects of this invention will be evident when viewed in light of the drawings, detailed description, and appended claims.

BRIEF DESCRIPTION OF THE DRAWINGS

The invention may take physical form in certain parts and arrangements of parts, a preferred embodiment of which will be described in detail in the specification and illustrated in the accompanying drawings which form a part hereof, and wherein:

FIG. 2 is an elevational view schematically illustrating one configuration for a venturi cell;

FIG. 3 is an elevational view schematically illustrating a second configuration for a venturi cell;

DESCRIPTION OF THE PREFERRED EMBODIMENTS

This invention will now be described in detail with referenced to preferred embodiments thereof. Throughout the specification, including the claims, compositions are given in percent by weight unless the contrary is expressly stated.

Figure 1:
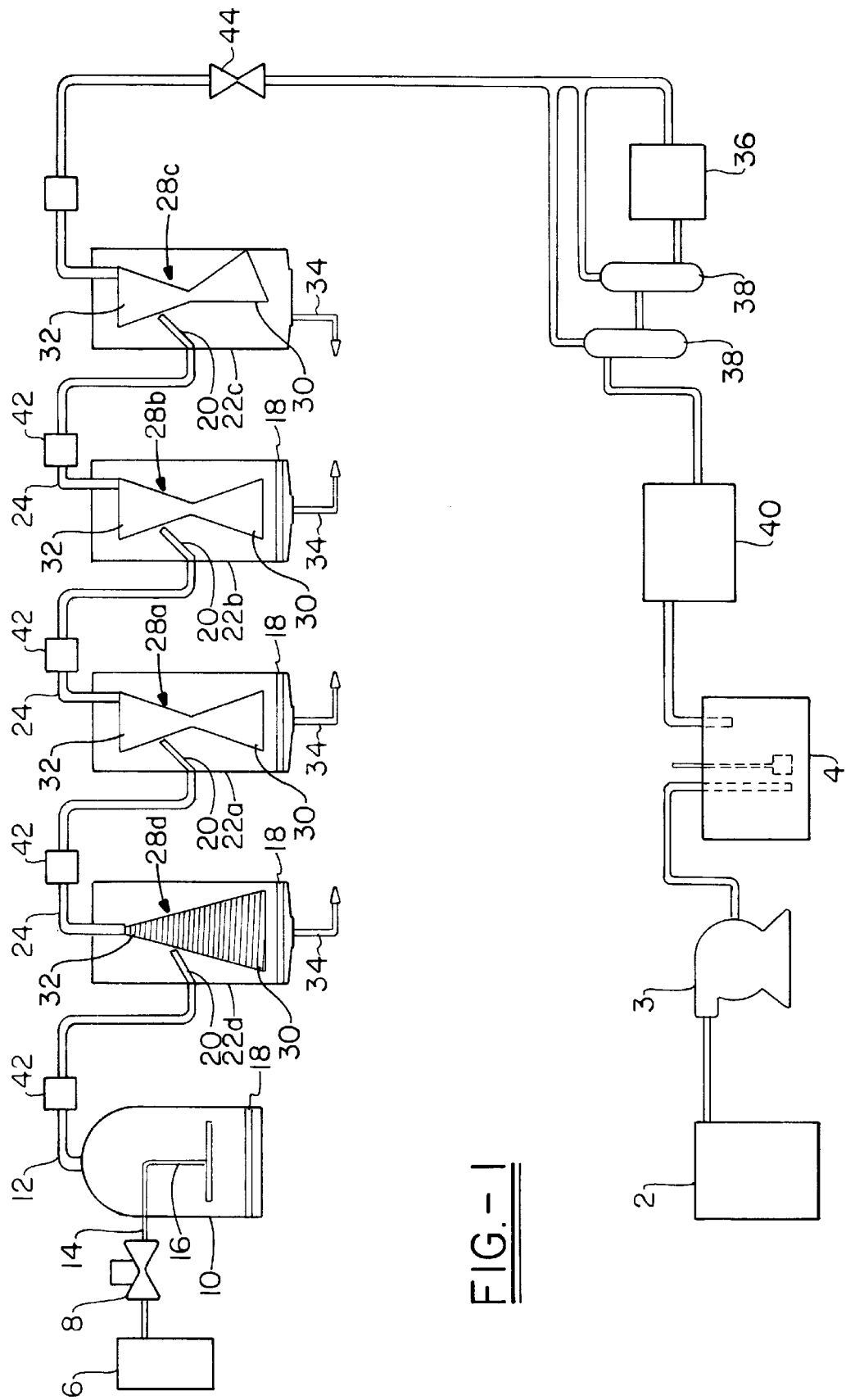
FIG. 1 is reaction schematic of the recovery/purification unit showing several venturi cells connected in series.

With reference to FIG. 1, an overall reaction schematic sequence is shown for the processing and purification of a gas, e.g., refrigerant, such as R-12 (dichlorodifluoromethane). In this instance, the refrigerant which has become contaminated with non-condensables or water or acidic materials, or combinations thereof is shown within cylinder 6 prior to entry into cylinder 10 via solenoid valve 8, said cylinder 10 having a vapor side 12 and a liquid side 14 with a dip tube 16 therein and a cylinder or tank heater 18 disposed at the bottom of the cylinder or tank. The vapor side 12 of the cylinder receives gaseous refrigerant for transfer into the inlet side 20 of at least one venturi cell 22a/b/c/d. These cells have outlet side 24 and a drain plug 34 at the bottom, for removal of any accumulated condensed water vapor which is removed from the refrigerant. The venturi 28a/b/c/d within the venturi cell can assume various configurations as will be discussed below. In one embodiment of the invention, the venturi will have a bottom half 30 which is capable of receiving the refrigerant through an opening disposed therein and an upper half 32, the upper half being essentially closed at the top with an outlet 24 for refrigerant for passage to a compressor 36, an oil separator 38, a condenser 40 and ultimately returning to the holding cylinder 4 with pumping 3 to the recovery cylinder 2. Optionally, sight glasses 42 and a valve 44 are interposed in the refrigerant path.

FIG. 2 illustrates one embodiment of the venturi cell 22a which is used in the refrigerant purification and processing. In this configuration, the venturi cell itself is positioned within a housing, preferably cylindrical 46 into which is positioned two conic segments 48 and 52. The first conate segment 48 is open at a base 72 of the segment, thereby permitting the ingress of refrigerant 64 into, and closed at its apex 74. The second conate segment 52 is a frustoconical segment which joins the first conate segment 48 at a region 50 between the apex and base of this first conate segment. The second conate segment is closed at its base 78 and closed at the frustum 76 at which region 50 it is attached to the first conate segment 48. Refrigerant therefore, enters the first conate segment 48 and proceeds into the second conate segment 52 by egress through at least one aperture 50, preferably more than one aperture, in the first conate segment above the attachment region 50 and the apex 74 of the first conate segment. The size of the apertures coupled with the flow rate of the refrigerant will create a pressure drop between the first and second conate regions, thereby causing a decrease in the temperature of the refrigerant as it passes from the first to the second conate region by the Joule-Thompson effect, the inherent cooling of a gas as it expands from a region of higher pressure into a region of lower pressure. This cooling effect will also cool both the interior and exterior walls of the second conate region at a location adjacent to and above the attachment region 50, thereby permitting and facilitating condensation of condensables residing within the refrigeration stream.

In order to maximize the venturi effect within the venturi cell, it is preferred, although not required, that the inlet side 20 be directed toward a top of the venturi cell by an angularity α of the inlet into the venturi cell 22. Preferably, the angle α is less than 90°, and more preferably, is less than 45°. An angle of 37° has been found to work satisfactorily, although the preferably degree of angularity of this inlet stream is believed to be dependent upon the flow rate of the refrigerant stream as well as the geometry of the first and second conate sections. In order to facilitate the swirling pattern within the venturi cell, a pair of wings 60, 62 are affixed to the base of the second conate section. It is believed that a maximal configuration will have a differing lengths for the wing extensions. The swirling pattern is maintained in the second conate segment by positioning of the egress tube 24 at one side of the base of this segment as well as the positioning of the egress apertures toward the apex of the first conate segment. The venturi cell will optionally have shut-off valves 66, 68, 70 to stop the flow of refrigerant and condensables as they may be removed from the venturi cell through drain tube 34. Non-condensable vapors (e.g., acid gases) are removed via tube 92 into collection vessel 94.

Figure 7:
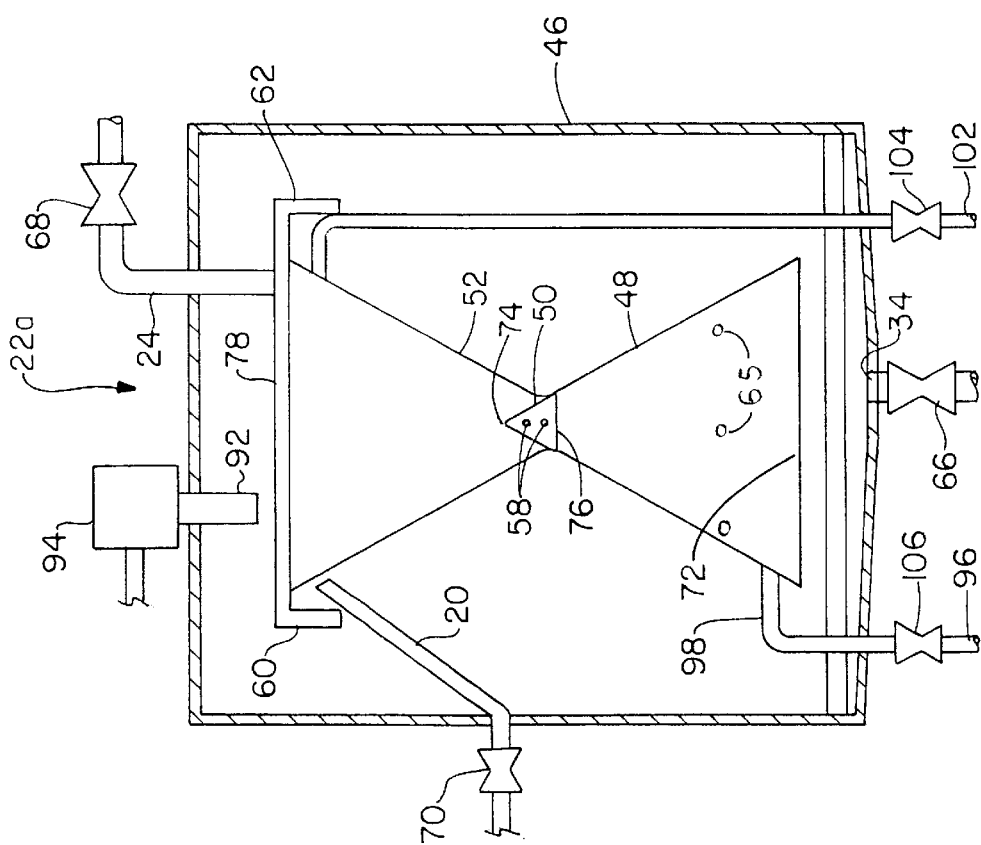
FIG. 7 is a elevational view schematically illustrating a modification of the view shown in FIG. 2 showing the venturi cell with a closed bottom and a plurality of apertures for the inflow of gas.

FIG. 7 illustrates a variation of the embodiment shown in FIG. 2, wherein the first conate segment 48 is closed at its base 72 of the segment, thereby requiring the ingress of refrigerant into the conate segment through at least one and preferably a plurality of apertures 65, suitably positioned near the base of the segment.

In FIG. 3, a modification of the venturi cell shown in FIG. 2 is shown. This venturi cell 80 has a first frustoconical segment 82 which is open at its base and a second inverted frustoconical segment 84 which is closed at its base 90, the two conical segments attached at a neck attachment region 86 which is at the apex of the two frustoconical segments. In operation, the refrigerant will enter the venturi cell through inlet 20 and be directed toward a top of the venturi cell by an angularity α of the inlet into the venturi cell 80. Preferably, the angle α is less than 90°, and more preferably, is between 20–70°. A more preferred angle of 30–45° has been found to work satisfactorily, although the preferably degree of angularity of this inlet stream is believed to be dependent upon the flow rate of the refrigerant stream as well as the geometry of the first and second conate sections. The first frustoconical segment 82 is open at its base thereby permitting the inflow of refrigerant 88 through its base. At the neck attachment region 86, the narrow dimension of the neck limits the flow between the first frustoconical region 82 and the second frustoconical region 84, thereby creating a pressure differential between the two regions, this differential being proportionate to the flow rate of the refrigerant gas being passed through the cell. As the refrigerant gas passes through this neck region 86 and expands into the second conical segment 84, the refrigerant will decrease in the temperature due to the Joule-Thompson effect, the inherent cooling of a gas as it expands from a region of higher pressure into a region of lower pressure. This cooling effect will also cool both the interior and exterior walls of the second conate region 84 at a location adjacent to and above the neck attachment region 86, thereby permitting and facilitating condensation of condensables residing within the refrigeration stream through drain tube 110 with associated shut-off valve 108. While the outlet side of the venturi cell 80 is generally toward one side of the second frustoconical segment 84, it need not be so positioned, as shown in FIG. 3, wherein this exit tube 24 is positioned at approximately the middle of the base 90 of the second frustoconical segment. Optionally, a noncondensable removal tube 92 is positioned toward the top of the housing 46 to permit collection and removal of noncondensables which are contained within the refrigerant stream. In one specialized embodiment, the venturi effect will be supplemented by a second refrigerant flow stream supply 96 which enters the first frustoconical segment near its open-ended base 98 through shut-off valve 106 and exits near the close-ended base 90 of the second frustoconical segment 100 through shut-off valve 104 and second refrigerant return exit tube 102. In a preferred embodiment, and to provide additional fine-tuning of the recovery and purification system, a heater 112 is positioned at the base of the housing for temperature control if needed.

Figure 4:
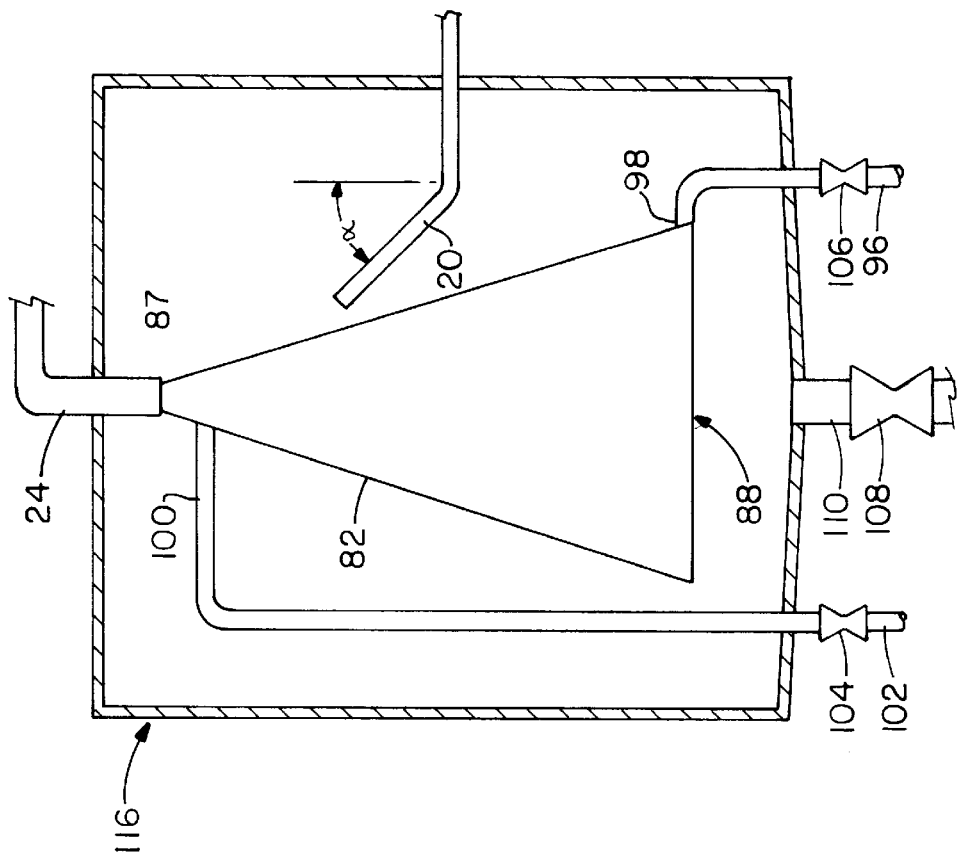
FIG. 4 is an elevational view schematically illustrating a third configuration for a venturi cell.

In FIG. 4, a modification of the venturi cell shown in FIG. 3 is shown. This venturi cell 114 has a first frustoconical segment 82 which is open at its base and angled with respect to a longitudinal axis of the cell, and a second inverted frustoconical segment 84 which is closed at its base 90, the two conical segments attached at a neck attachment region 86 which is at the apex of the two frustoconical segments and having a degree of angularity β as measured along a longitudinal axis of the cell. Preferably, this angle β is between 5–80° inclusive, and more preferably, between 20–60° inclusive, and most preferredly, between 40–50° inclusive. In operation, the refrigerant will enter the venturi cell through inlet 20 and be directed toward a top of the venturi cell by an angularity α of the inlet into the venturi cell 114. Preferably, the angle α is less than 90°, and more preferably, is between 20–70°. A more preferred angle of 30–45° has been found to work satisfactorily, although the preferably degree of angularity of this inlet stream is believed to be dependent upon the flow rate of the refrigerant stream as well as the geometry of the first and second conate sections. The first frustoconical segment 82 is open at its base thereby permitting the inflow of refrigerant 88 through its base. At the neck attachment region 86, the narrow dimension of the neck limits the flow between the first frustoconical region 82 and the second frustoconical region 84, thereby creating a pressure differential between the two regions, this differential being proportionate to the flow rate of the refrigerant gas being passed through the cell. As the refrigerant gas passes through this neck region 86 and expands into the second conical segment 84, the refrigerant will decrease in the temperature due to the Joule-Thompson effect, the inherent cooling of a gas as it expands from a region of higher pressure into a region of lower pressure. This cooling effect will also cool both the interior and exterior walls of the second conate region 84 at a location adjacent to and above the neck attachment region 86, thereby permitting and facilitating condensation of condensables residing within the refrigeration stream through drain tube 110 with associated shut-off valve 108. While the outlet side of the venturi cell 114 is generally toward one side of the second frustoconical segment 84, it need not be so positioned, as shown in FIGS. 3–4, wherein this exit tube is positioned at approximately the middle of the base 90 of the second frustoconical segment. In one specialized embodiment, the venturi effect will be supplemented by a second refrigerant flow stream supply 96 which enters the first frustoconical segment near its open-ended base 98 through shut-off valve 106 and exits near the close-ended base 90 of the second frustoconical segment 100 through shut-off valve 104 and second refrigerant return exit tube 102.

Figure 5:
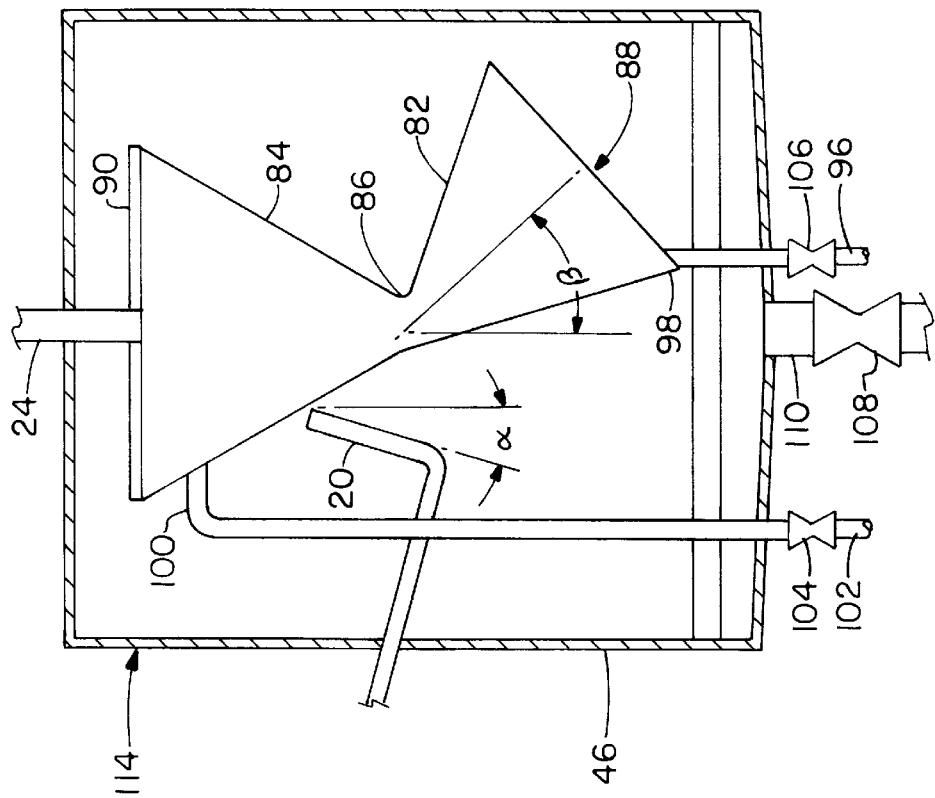
FIG. 5 is an elevational view schematically illustrating a fourth configuration for a venturi cell.

In FIG. 5, yet another modification of the venturi cell is shown. This venturi cell 116 has only a single conate segment 82 which is open at its base. In operation, the refrigerant will enter the venturi cell through inlet 20 and be directed toward a top of the venturi cell by an angularity α of the inlet into the venturi cell 116. Preferably, the angle α is less than 90°, and more preferably, is between 20–70°. A more preferred angle of 30–45° has been found to work satisfactorily, although the preferably degree of angularity of this inlet stream is believed to be dependent upon the flow rate of the refrigerant stream as well as the geometry of the first and second conate sections. The conical segment 82 is open at its base thereby permitting the inflow of refrigerant 88 through its base. At the apex of the conical segment 87, the narrow dimension of the neck, which is at least slightly smaller than that of the internal diameter of exit tube 24, limits the flow into exit tube 24, thereby creating a pressure differential between the conical segment 82 and exit tube 24, this differential being proportionate to the flow rate of the refrigerant gas being passed through the cell. As the refrigerant gas passes through this apical neck region 87, it partially expands and thereby lowers temperature of the refrigerant due to the Joule-Thompson effect, the inherent cooling of a gas as it expands from a region of higher pressure into a region of lower pressure. This cooling effect will also cool the interior and exterior walls of the conate region 82 at a location adjacent to and above the apical neck region 87, thereby permitting and facilitating condensation of condensables residing within the refrigeration stream through drain tube 110 with associated shut-off valve 108. In one specialized embodiment, the venturi effect will be supplemented by a second refrigerant flow stream supply 96 which enters the conate segment 82 near its open-ended base 98 through shut-off valve 106 and exits near the apical neck region 87 via return 100 through shut-off valve 104 and second refrigerant return exit tube 102.

Figure 6:
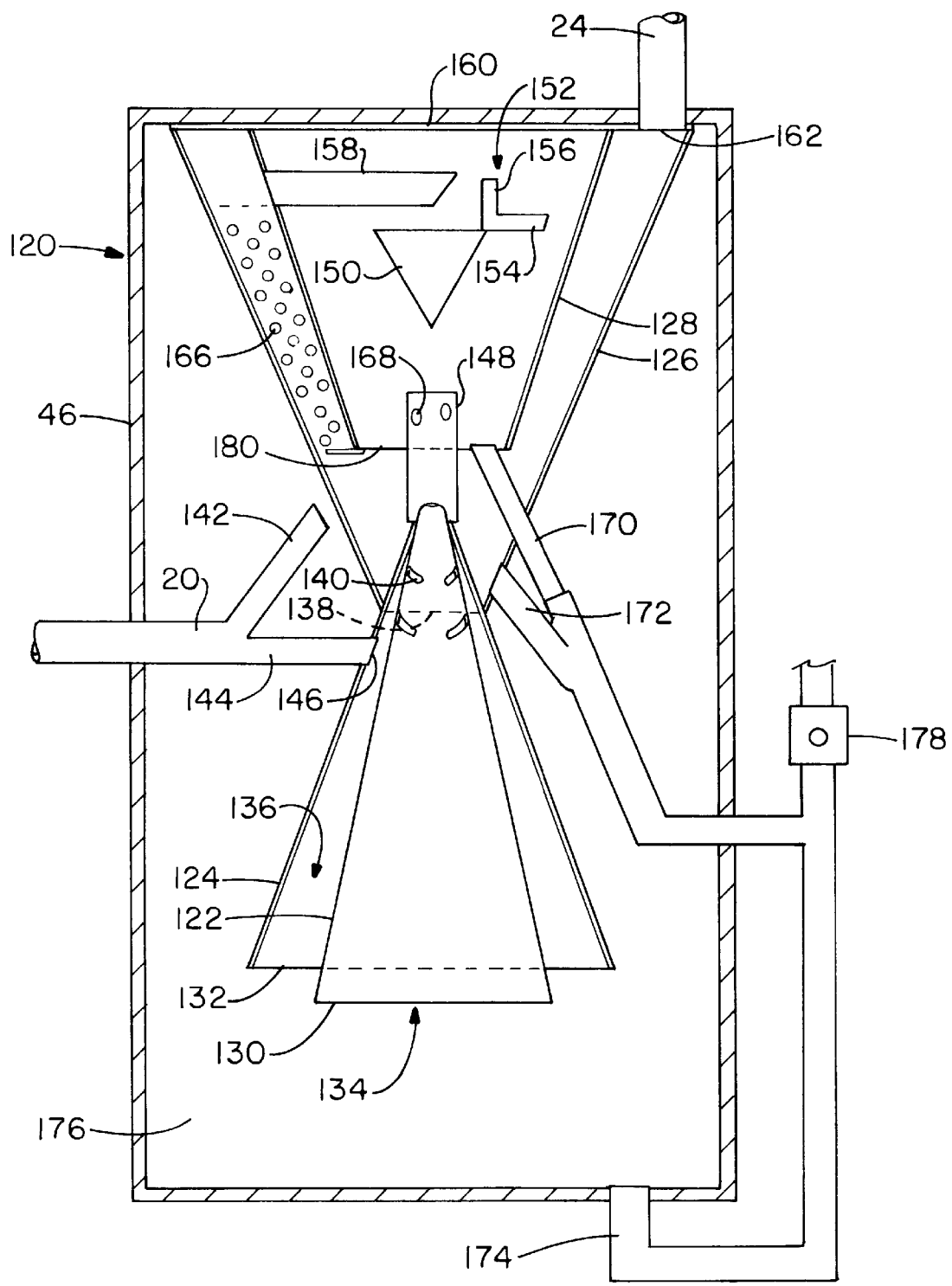
FIG. 6 is an elevational view schematically illustrating a fifth configuration for a venturi cell.

In FIG. 6, still yet another modification of the venturi cell is shown, especially useful on the supply side of the compressor. In this configuration, the venturi cell itself is positioned within a housing, preferably cylindrical 46 into which is positioned various conical segments. A lower outer conic segment 122 is sealingly positioned within a lower interior conic segment 124, preferably having an inner circular opening 130 which extends beyond an outer circular opening 132. Refrigerant enters into the venturi cell 120 via inlet 20, which bifurcates into a first inlet segment 142 which is directed upwardly within the cell and a second inlet segment 144 which penetrates into the lower chamber formed between the first and second lower conate segments at the exit port 146 of the second segment. Most of the refrigerant flow from the second inlet segment is directed in a downward pathway in this lower chamber, with a portion being directed into at least one, preferably two or more perforations 140 near an apex of the inner conate segment.

The upper conate segment within the venturi cell is also comprised of various conical segments. An upper outer conic segment 126 is a frustoconical segment which joins with the lower outer conate segment 124 at a region 138 between the apex and base of this lower outer conate segment. The second conate segment is closed at its base 162 and closed at the region 138 at which region it is attached to the lower outer conate segment 124. Entirely disposed within the upper outer conate segment 126 is an inner frustoconical conate segment 128 with a closed base 160 and an inverted top 180 in sealing engagement with a protruding conduit 148 in communication with an opening at the apex of the lower inner conate segment 122. This conduit allows passage of the refrigerant gas from the interior region 176 of the cell through the lower inner conate segment 134 and into the upper interior conate segment 128 for impingement of the gas onto impingement dam 150 after egress through at least one exit port 168. The impingement dam will optimally have a protruding tip 152 with a laterally extending arm 154 and a vertically extending arm 156 for maintaining a swirling gaseous pattern as well as facilitating the liquid removal from the gas stream.

An upper entry conduit 158 permits passage of the refrigerant gas into the upper chamber defined between the upper inner and outer conate segments for eventual egress through exit 24. In a preferred embodiment, at least a portion of the upper chamber will contain a filter material 166, suitable for oil removal from the refrigerant stream. Inner liquid removal conduit 170, positioned within the inverted top of the inner conate segment 128, and outer liquid conduit removal conduit 172, positioned near sealing region 138, allow for the removal of any accumulated liquid(s), either oil or condensed water vapor, as well as lower liquid conduit 174.

In order to maximize the venturi effect within the venturi cell, it is preferred, although not required, that the inlet side 20 be directed toward a top of the venturi cell by an angularity α of the inlet into the venturi cell 22. Preferably, the angle is less than 90°, and more preferably, is less than 45°. An angle of 37° has been found to work satisfactorily, although the preferably degree of angularity of this inlet stream is believed to be dependent upon the flow rate of the refrigerant stream as well as the geometry of the first and second conate sections.

Without being bound to any one particular theory of operation, it is believed that hot refrigerant vapor and oil enter the venturi cell via inlet tube 20 with bifurcation into two separate streams. The vapor which is released through conduit 142 enters the interior of the cell with minimal resistance and will be the primary discharge location. Impingement of the refrigerant will be onto the exterior wall of the upper outer venturi segment 126 and will raise the temperature of this impinged portion of the segment, typically in proximity to that which contains the filter medium 166. The hot oily vapor will decrease in temperature due to a combination of the Joule-Thompson effect coupled with the lower exterior venturi cell wall temperatures. This cooler refrigerant gas initially released from conduit 142 will recombine with the bifurcated refrigerant gas which exited through conduit 146 into the lower chamber 136 between the lower two conate segments, 122,124 and enter the lower inner conate segment 122 through opening 130 as shown at 134, thereby reheating the refrigerant gas which was in the interior 176 of the venturi cell, the temperature in this lower chamber region being between 4–15° F. hotter than that within the interior of the lower conate segment 122. As the refrigerant vapor moves through the inner conate segment, it is impinged and still further reheated by the at least one, and preferably more than one perforation in the upper region of the inner conate segment, for which at least a portion of the refrigerant gas which flowed through segment 144 and port 146 will pass thereby creating turbulence in the upwardly flowing refrigerant stream. This refrigerant stream passes through at least one opening 168 in protruding conduit 148 under pressure (i.e., 115–125 psig) striking dam 150. In this low-pressure area of the cell, oil that was missed prior to this chamber is now collected and the cooled refrigerant enters conduit 158 for passage into the upper chamber between the inner 128 and outer 126 upper conate segments. In a preferred embodiment, this chamber will contain at least a portion of a filter media, (e.g., a gas line filter media) to aid in the oil separation. Due to the impingement angle α, this refrigerant gas will be reheated and egress via exit line 24. Recovered oil is returned back to the compressor by a solenoid valve 178 which is activated in a definable timing sequence.

In one alternative embodiment of the invention of the configuration described in conjunction with FIG. 6, it is recognized that a temperature sensitive solenoid valve could be added into protruding conduit 148, thereby maximizing the Joule-Thompson effect, by assisting in the development of a higher pressure on one side of the venturi cell which is prior to the constriction device, e.g., protruding conduit 148 or the apertures 168. Upon the sensing of a predefined temperature, the solenoid valve would open, thereby permitting flow through the apertures 168 in a pulsed manner.

In another aspect of this invention, it is seen that what has been described in this invention is the application of a venturi cell design which has a plurality of impingement surfaces which aid in the coalescence of various condensable contaminants in the gas feed stream. These impingement surfaces can be the lower conate segment 122, or the upper outer conate segment 126, or similarly configured surfaces.

EXAMPLE

A venturi arrangement as described in FIGS. 1–2 was constructed and arranged and tested using R-12 (diclorofluoromethane) at a flow rate of 8 oz./min, the refrigerant initially being loaded to a level of 35 ppm by weight water. The system was tested at various pressures, not optimized, as indicated in the Table. It is clear that it was possible to reduce the amount of water vapor contained within the refrigerant through the use of the above described system.

TABLE I

| R-12 Refrigerant (Dichlorodifluoromethane) | | | | |
|---|---|---|---|---|
| Composition | Initial | 20–32 psig | 15–26 psig | 1–9 psig |
| High Boiling Residues (% by volume) | 2.23 | .03 | .02 | <.01 |
| Water (ppm by weight) | 35 | 20 | 11 | 24 |

The testing was conducted in accordance with Appendix 95 of ARI Standard 700. The results are for a single pass through a single Venturi unit at the identified three different pressure ranges supplied to the inlet of the unit.

This invention has been described in detail with reference to specific embodiments thereof, including the respective best modes for carrying out each embodiment. It shall be understood that these illustrations are by way of example and not by way of limitation.

What is claimed is:

1. A process for the purification of a gas which comprises feeding the gas through at least one venturi cell at a pressure and a flow rate, said flow rate being from about 0.1 oz per minute to about 50 oz per minute inclusive;

said cell comprising
an inlet in a housing,
an outlet from said housing,
a first conical segment within said housing, said first conical segment having a means through which said gas can enter,
a second conical segment within said housing in connectedly affixed to said first conical segment in a leak-proof manner and in communication with said first conical segment to permit gas flow therethrough and into said outlet from said housing, outlet from said housing, and
a pressure differential creating means for creating a pressure differential between said first and said second conical segments; and
recovering said gas.

2. The process of claim 1 wherein
said pressure differential creating means is a neck region having a neck internal diameter which is less than an internal diameter of said open base of said first conical segment.

3. The process of claim 1 wherein
said pressure differential creating means is at least one aperture between said first conical segment and said second conical segment.

4. The process of claim 1 which further comprises
a step of heating at least a portion of said gas in said housing.

5. The process of claim 1 wherein
a pressure within said first conical segment is higher than a pressure within said second conical segment.

6. The process of claim 1 wherein
said step of feeding comprises at least two venturi cells.

7. The process of claim 6 wherein
said step of feeding comprises at least three venturi cells.

8. The process of claim 1 wherein said flow rate is about 2 oz per minute to about 25 oz per minute inclusive.

9. A process for the purification of a gas, the process comprising the steps of:
feeding the gas through at least one venturi cell at a pressure and a flow rate;
said cell comprising:
an inlet in a housing; said inlet in said housing being directed upward so that an angle defined between a vertical wall of the cell and a longitudinal axis of said inlet is less than 90°;
an outlet from said housing;
a first conical segment within said housing, said first conical segment having a means through which said gas can enter;
a second conical segment within said housing and connectedly affixed to said first conical segment in a leak-proof manner and in communication with said first conical segment to permit gas flow therethrough and into said outlet from said housing; and
a pressure differential creating means for creating a pressure differential between said first and said second conical segments; and
recovering said gas.

10. The process of claim 9 wherein
said angle is between about 20–70° inclusive.

11. The process of claim 10 wherein
said angle is between about 30–45° inclusive.

12. A process for the purification of a gas, the process comprising the steps of:
feeding the gas through at least one venturi cell at a pressure and a flow rate;
said cell comprising:
an inlet in a housing;
an outlet from said housing;
a first conical segment within said housing, said first conical segment having a means through which said gas can enter;
a second conical segment within said housing and connectedly affixed to said first conical segment in a leak-proof manner and in communication with said first conical segment to permit gas flow therethrough and into said outlet from said housing an angle formed at an intersection of a longitudinal axis of said first conical segment and a longitudinal axis of said second conical segment being between about 5–80° inclusive; and
a pressure differential creating means for creating a pressure differential between said first and said second conical segments; and
recovering said gas.

13. The process of claim 12 wherein
said angle is between about 20–60° inclusive.

14. The process of claim 13 wherein
said angle is between about 40–50° inclusive.

15. A process for the purification of a gas the process comprising the steps of:
feeding the gas through at least one venturi cell at a pressure and a flow rate,
said cell comprising
an inlet in a housing,
an outlet from said housing,
a conical segment within said housing, said first conical segment having an open base through which said gas can enter and a neck having an internal diameter which is less than an internal diameter of said open base; said neck disposed in said outlet; and
a pressure differential creating means for creating a pressure differential between said conical segment and said outlet; and
recovering said gas.

16. The process of claim 15 wherein
said pressure differential creating means is a neck region at an apex of said cell, and wherein a neck internal diameter is less than an internal diameter of said outlet.

17. The process of claim 15 wherein
said pressure differential creating means is at least one aperture between said conical segment and said outlet.

18. The process of claim 15 which further comprises
a step of heating at least a portion of said gas in said housing.

19. The process of claim 15 wherein
said step of feeding comprises at least two venturi cells.

20. A process for the purification of a gas which comprises
feeding the gas through at least one venturi cell at a pressure and a flow rate,
said cell comprising
an inlet in a housing,
an outlet from said housing,
an inner lower conical segment within said housing, said inner lower conical segment having an open base through which said gas can enter,
an outer lower conical segment within said housing, said outer lower conical segment surrounding said inner lower conical segment, said outer lower conical segment having
a closed top,
an open base through which said gas can exit, and
an aperture through which at least a portion of said inlet communicates and whereby a chamber is formed between said inner and outer lower conical segments;
an inner upper conical segment within said housing and connectedly affixed to said inner lower conical segment in a leak-proof manner and in communication with said inner lower conical segment to permit gas flow therethrough;
an outer upper conical segment within said housing, said outer upper conical segment surrounding said inner upper conical segment, and in communication with said inner upper conical segment, said outer upper conical segment further in communication with said outlet, and whereby an upper chamber being defined between said inner and outer upper conical segments; and
a pressure differential creating means for creating a pressure differential between said inner lower conical segment and said inner upper conical second segments; and
recovering said gas.

21. The process of claim 20 wherein
at least a portion of said upper chamber further comprises a filter medium.

22. The process of claim 20 wherein
said pressure differential creating means is a neck region having a neck internal diameter which is less than an internal diameter of said open base of said inner lower conical segment.

23. The process of claim 20 wherein said pressure creating means is at least one aperture between said inner lower conical segment and said inner upper conical segment.

24. The process of claim 20 wherein said inlet is at least bifurcated, and wherein at least one inlet segment opens into an interior chamber of said venturi cell and wherein at least one other inlet segment opens into an inner lower chamber of said cell.

25. The process of claim 20 wherein said cell further comprises at least one liquid conduit removal line from said cell.

26. The process of claim 25 wherein said at least one liquid conduit removal line originates from at least one upper conduit segment.

27. The process of claim 26 wherein said at least one liquid conduit removal line originates from both said inner upper conical segment and said outer upper conical segment.

28. The process of claim 20 wherein said upper inner conical segment further comprises an impingement surface.

29. A process for the purification of a gas which comprises feeding the gas through at least one venturi cell on a pressure and a flow rate, said cell comprising
 an inlet in a housing
 an outlet from said housing
 four conical segments disposed within the housing configured in a lower conical assembly having an inner conical element and an outer conical and an upper conical assembly having an inner conical element and an outer conical element;
  the inner conical element of the lower conical assembly in fluid communication with the inner conical element of the upper conical assembly;
 said outlet from said housing in fluid communication with the outer conical element of the upper conical assembly; and
 a pressure differential creating means for creating a pressure differential between said inlet and said outlet; and recovering said gas.

30. The process of claim 29 wherein said means by which said gas can enter is an open base of said first conical segment.

31. The process of claim 29 wherein said means by which said gas can enter is at least one aperture in said first conical segment.

32. The process of claim 31 wherein said means by which said gas can enter is a plurality of apertures in said first conical segment.

33. A process for the purification of a gas, the process comprising the steps of:

feeding the gas through at least one venturi cell at a pressure and a flow rate without combining the gas with water;

said cell comprising:
 an inlet in a housing;
 an outlet from said housing;
 a first conical segment within said housing, said first conical segment having a means through which said gas can enter;
 a second conical segment within said housing and connectedly affixed to said first conical segment in a leak-proof manner and in communication with said first conical segment to permit gas flow therethrough and into said outlet from said housing; and
 a pressure differential creating means for creating a pressure differential between said first and said second conical segments; and recovering said gas.

34. A process for the purification of a gas, the process comprising the steps of:

feeding the gas through at least one venturi cell at a pressure and a flow rate;

said cell comprising:
 a housing having an inlet and an outlet;
 a first conical segment mounted within said housing;
 said first conical segment having an inlet through which gas can enter the first conical segment;
 a second conical segment mounted within said housing and connectedly affixed to said first conical segment in a leak-proof manner and in communication with said first conical segment to permit gas flow therethrough and into said outlet of said housing; said outlet of said being in communication with said inlet to said housing only through said first and second conical segments; and
 a pressure differential creating means for creating a pressure differential between said first and second conical segments; and recovering said gas.

35. A process for the purification of a gas, the process comprising the steps of:

feeding the gas through at least one venturi at a pressure and a flow rate;

said cell comprising:
 a housing having an inlet and an outlet;
 at least a first conical segment mounted within said housing, the first conical segment having an inlet through which gas can enter the first conical segment;
 means for delivering a refrigerant flow stream adjacent the inlet of the first conical segment;
 a pressure differential creating means for creating a pressure differential in the first conical segment;

delivering a refrigerant flow stream through the means for delivering; and recovering said gas.

* * * * *

UNITED STATES PATENT AND TRADEMARK OFFICE
CERTIFICATE OF CORRECTION

PATENT NO. : 5,948,145

DATED : September 7, 1999

INVENTOR(S) : Tommy D. Welch

It is certified that error appears in the above-identified patent and that said Letters Patent is hereby corrected as shown below:

The issued patent states that the patent is subject to a terminal disclaimer. This statement is on the front page of the patent. No terminal disclaimer was filed in this patent and the patent is not subject to a terminal disclaimer.

Signed and Sealed this

Twenty-second Day of February, 2000

Attest:

Q. TODD DICKINSON

Attesting Officer

Commissioner of Patents and Trademarks